(12) United States Patent
Jung et al.

(10) Patent No.: US 9,627,719 B2
(45) Date of Patent: Apr. 18, 2017

(54) CHARGING METHOD OF BATTERY AND BATTERY CHARGING SYSTEM

(71) Applicant: Samsung SDI Co., Ltd., Yongin-si, Gyeonggi-do (KR)

(72) Inventors: Joosick Jung, Yongin-si (KR); Subin Song, Yongin-si (KR); Myoungseok Lee, Yongin-si (KR); Dmitry Golovanov, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 172 days.

(21) Appl. No.: 14/203,526

(22) Filed: Mar. 10, 2014

(65) Prior Publication Data

US 2015/0077058 A1 Mar. 19, 2015

(30) Foreign Application Priority Data

Sep. 17, 2013 (KR) .................. 10-2013-0111972

(51) Int. Cl.
*H02J 7/00* (2006.01)
*H01M 10/44* (2006.01)
*H01M 10/48* (2006.01)

(52) U.S. Cl.
CPC ......... *H01M 10/44* (2013.01); *H01M 10/443* (2013.01); *H01M 10/48* (2013.01);
(Continued)

(58) Field of Classification Search
CPC .. H01M 10/44; H02J 7/00; H02J 7/007; H02J 7/0073; H02J 7/008
(Continued)

(56) References Cited

U.S. PATENT DOCUMENTS

2009/0295338 A1* 12/2009 Hawawini ............. H02J 7/0073
320/157
2010/0194351 A1 8/2010 Nagashima et al.
(Continued)

FOREIGN PATENT DOCUMENTS

EP 1 158 306 A2 11/2001
EP 1 571 747 A1 9/2005
(Continued)

OTHER PUBLICATIONS

KIPO Office action dated Sep. 4, 2014, for Korean priority Patent application 10-2013-0111972, (4 pages).
(Continued)

*Primary Examiner* — Vuthe Siek
(74) *Attorney, Agent, or Firm* — Lewis Roca Rothgerber Christie LLP

(57) ABSTRACT

A method of charging a battery and a battery charging system, which has a relatively high charging speed while having a relatively low level of battery deterioration. The charging method includes charging a battery cell with a first current in a first constant current mode; charging the battery cell with a first voltage in a first constant voltage mode; idling the charging of the battery cell for a first idle period (t); charging the battery cell with a second current different from the first current in a second constant current mode; and charging the battery cell with a second voltage different from the first voltage in a second constant voltage mode.

20 Claims, 5 Drawing Sheets

(52) U.S. Cl.
CPC ............ *H01M 10/486* (2013.01); *H02J 7/008* (2013.01); *H02J 7/0073* (2013.01)

(58) Field of Classification Search
USPC ........................................................ 320/112
See application file for complete search history.

(56) References Cited

U.S. PATENT DOCUMENTS

| | | | |
|---|---|---|---|
| 2011/0012563 A1 | 1/2011 | Paryani et al. | |
| 2011/0037438 A1 | 2/2011 | Bhardwaj et al. | |
| 2011/0169459 A1* | 7/2011 | Chen | H02J 7/0057 320/160 |
| 2011/0266998 A1* | 11/2011 | Xiao | H02J 7/0073 320/107 |
| 2012/0086406 A1 | 4/2012 | Maeagawa | |
| 2012/0112703 A1* | 5/2012 | Xu | H02J 7/0022 320/145 |

FOREIGN PATENT DOCUMENTS

| | | |
|---|---|---|
| JP | 06-98472 | 4/1994 |
| JP | 2010-252474 | 11/2010 |
| JP | 2011024412 A | 2/2011 |
| KR | 10-2012-0028350 | 3/2012 |
| WO | WO 2009/110221 A1 | 9/2009 |
| WO | WO 2011/022150 A1 | 2/2011 |

OTHER PUBLICATIONS

Patent Abstracts of Japan, and English machine translation of Japanese Publication 6-98472 dated Apr. 8, 1994, listed above, (7 pages).

EPO Search Report dated May 15, 2015, for corresponding European Patent application 14181111.7, (5 pages).

* cited by examiner

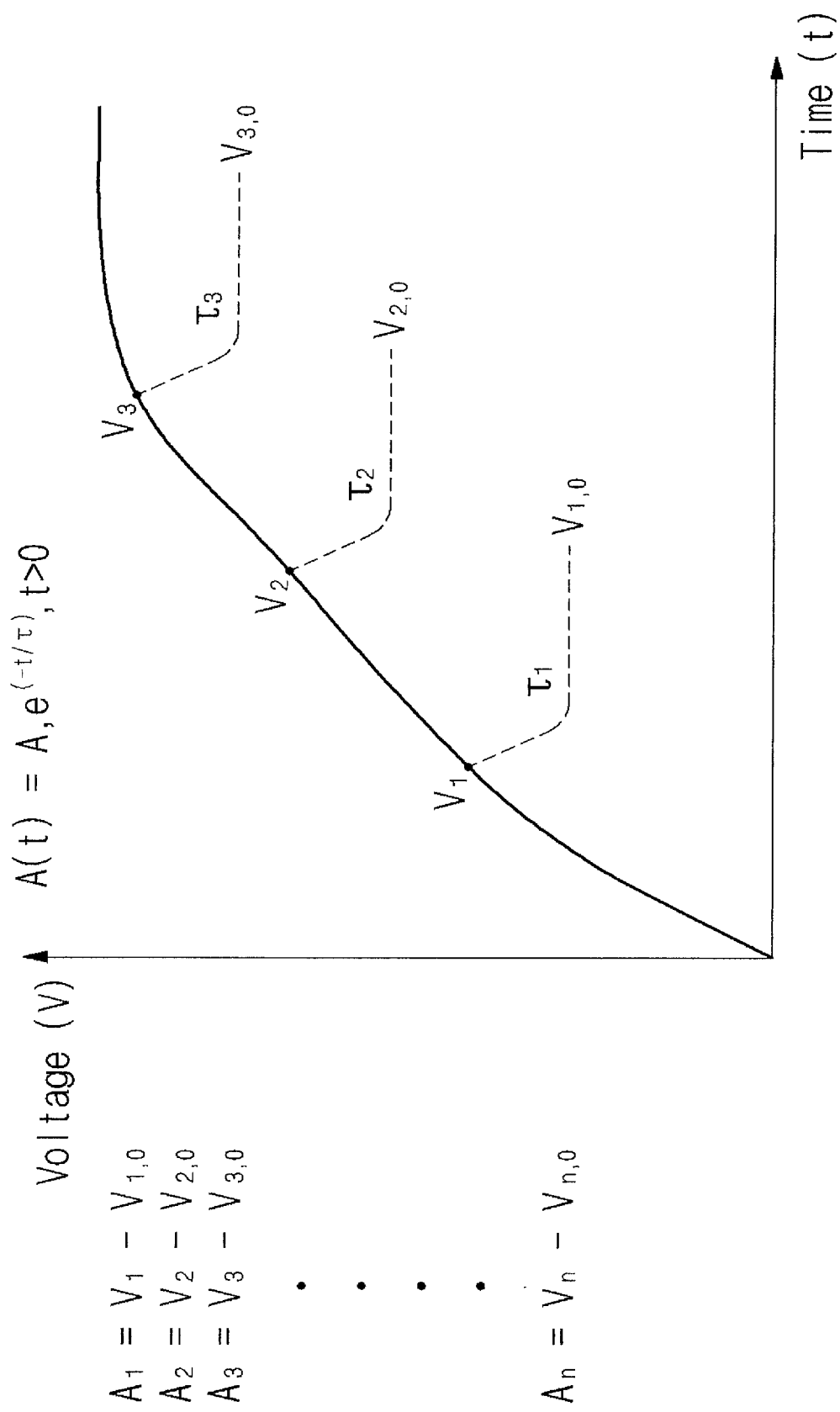

CHARGING METHOD OF BATTERY AND BATTERY CHARGING SYSTEM

CROSS-REFERENCE TO RELATED APPLICATIONS

This application claims priority to and the benefit of Korean Patent Application No. 10-2013-0111972, filed on Sep. 17, 2013, the entire content of which is incorporated herein by reference.

BACKGROUND

1. Field

Embodiments of the present invention relate to a method of charging a battery and a battery charging system.

2. Description of the Related Art

In general, a battery that is not designed to be reused once it is fully discharged is referred to as a primary battery, and a battery that can be repeatedly used, even after its initial discharge (e.g. discharged and recharged repeatedly), is referred to as a secondary battery. Recently, as demand and distribution of feature phones, smart phones, PDA phones, digital cameras, notebook computers, electrically driven tools, hybrid vehicles, electric vehicles, and so on, have rapidly increased, there has been a corresponding increase in demand for secondary batteries.

A secondary battery is generally charged in a constant current mode or a constant voltage mode. That is to say, in charging a secondary battery, the secondary battery is charged with a constant current until a predetermined battery voltage is reached, and then charged with a constant battery voltage, thereby allowing a charging current to be naturally reduced.

SUMMARY

Aspects of embodiments according to the present invention provide a method of charging a battery and a battery charging system, which has a relatively high charging speed while having a relatively low level of battery deterioration.

According to one embodiment of the present invention, there is provided a method of charging a battery including charging a battery cell with a first current in a first constant current mode, charging the battery cell with a first voltage in a first constant voltage mode, idling the charging of the battery cell for a first idle period (t), charging the battery cell with a second current different from the first current in a second constant current mode, and charging the battery cell with a second voltage different from the first voltage in a second constant voltage mode.

The idle period (t) may be in a range of 1 ms to 10 s.

The idle period (t) may be 1 to 10 times a voltage stabilizing time ($\tau$) of the battery cell.

The voltage stabilizing time ($\tau$) of the battery cell may be an amount of time taken to reduce a value A(t) of the following equation by 1/e:

$$A(t) = A_n e^{-t/\tau}$$

where $A_n$ is a value obtained by subtracting a stabilized battery cell voltage $v_{n,0}$ from a battery cell voltage $V_n$ of an initial stage of the idle period (t), where n is a natural number and t is greater than 0.

The charging method may further include calculating a charge capacity of the battery cell, wherein the idle period (t) is proportional to the charge capacity of the battery cell.

The charging method may further include sensing a temperature of the battery cell, wherein the idle period (t) is inversely proportional to the temperature of the battery cell.

The charging method may further include determining whether or not a voltage of the battery cell reaches a first reference voltage by sensing the voltage of the battery cell while charging the battery cell with the first current in the first constant current mode, and determining whether or not a current of the battery cell reaches a first reference current by sensing a charge current of the battery cell while charging the battery cell with the first voltage in the first constant voltage mode.

When the charge current of the battery cell reaches the first reference current, the idling may be performed.

The charging method may further include determining whether or not a voltage of the battery cell reaches a second reference voltage by sensing the voltage of the battery cell while charging the battery cell with the second current in the second constant current mode, and determining whether or not a charge current of the battery cell reaches a second reference current by sensing the charge current of the battery cell while charging the battery cell with the second voltage in the second constant voltage mode.

The second reference voltage may be greater than the first reference voltage.

The second reference current may be smaller than the first reference current.

According to another embodiment of the present invention, there is provided a system for charging a battery pack including a battery cell, a voltage sensor sensing a voltage of the battery cell and a current sensor sensing a charge current for charging the battery cell, and a charging unit charging a battery cell with a first current in a first constant current mode, charging the battery cell with a first voltage in a first constant voltage mode, idling the charging of the battery cell for a first idle period (t), charging the battery cell with a second current different from the first current in a second constant current mode, and charging the battery cell with a second voltage different from the first voltage in a second constant voltage mode.

The idle period (t) may be in a range of 1 ms to 10 s.

The idle period (t) may be 1 to 10 times a voltage stabilizing time ($\tau$) of the battery cell.

The voltage stabilizing time ($\tau$) of the battery cell may be a time taken to reduce a value A(t) of the following equation by 1/e:

$$A(t) = A_n e^{-t/\tau}$$

where $A_n$ is a value obtained by subtracting a stabilized battery cell voltage $v_{n,0}$ from a battery cell voltage $V_n$ of an initial stage of the idle period (t), where n is a natural number and t is greater than 0.

The battery charging system may further include a calculation unit for calculating a charge capacity of the battery cell, wherein the idle period (t) of the charging unit is controlled to be proportional to the charge capacity of the battery cell.

The battery charging system may further include a temperature sensor for sensing a temperature of the battery cell, wherein the idle period (t) of the charging unit is controlled to be inversely proportional to the temperature of the battery cell.

As described above, the embodiments of the present invention provide a method of charging a battery and a system for charging a battery pack, which has a relatively high charging speed while having a relatively low level of deterioration.

That is to say, embodiments the present invention include at least two sections of constant current, constant voltage charging modes having an idle period, and the idle period is in a range of 1 ms to 1 s, and is 1 to 10 times of a voltage stabilizing time (τ) of the battery cell. Therefore, according to embodiments of the present invention, the battery can be rapidly charged and the voltage of the battery cell is fully stabilized during the idle period, thereby suppressing battery deterioration. In other words, since intercalated/deintercalated states of lithium ions with respect to positive/negative active materials are optimized during the idle period, battery deterioration can be reduced while enabling rapid charging of the battery.

Additional aspects and/or features of the invention will be set forth in part in the description which follows and, in part, will be obvious from the description, or may be learned by practice of the invention.

BRIEF DESCRIPTION OF THE DRAWINGS

The objects, features and aspects of the present invention will become more apparent from the following detailed description in conjunction with the accompanying drawings, in which:

FIG. 1C illustrates a voltage stabilizing time (τ) of a battery cell;

DETAILED DESCRIPTION OF THE INVENTION

Hereinafter, a method of charging a battery and the battery charging system according to an exemplary embodiment of the invention will be described in detail with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art.

As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Expressions such as "at least one of," when preceding a list of elements, modify the entire list of elements and do not modify the individual elements of the list. Further, the use of "may" when describing embodiments of the present invention refers to "one or more embodiments of the present invention."

Figure 1A:
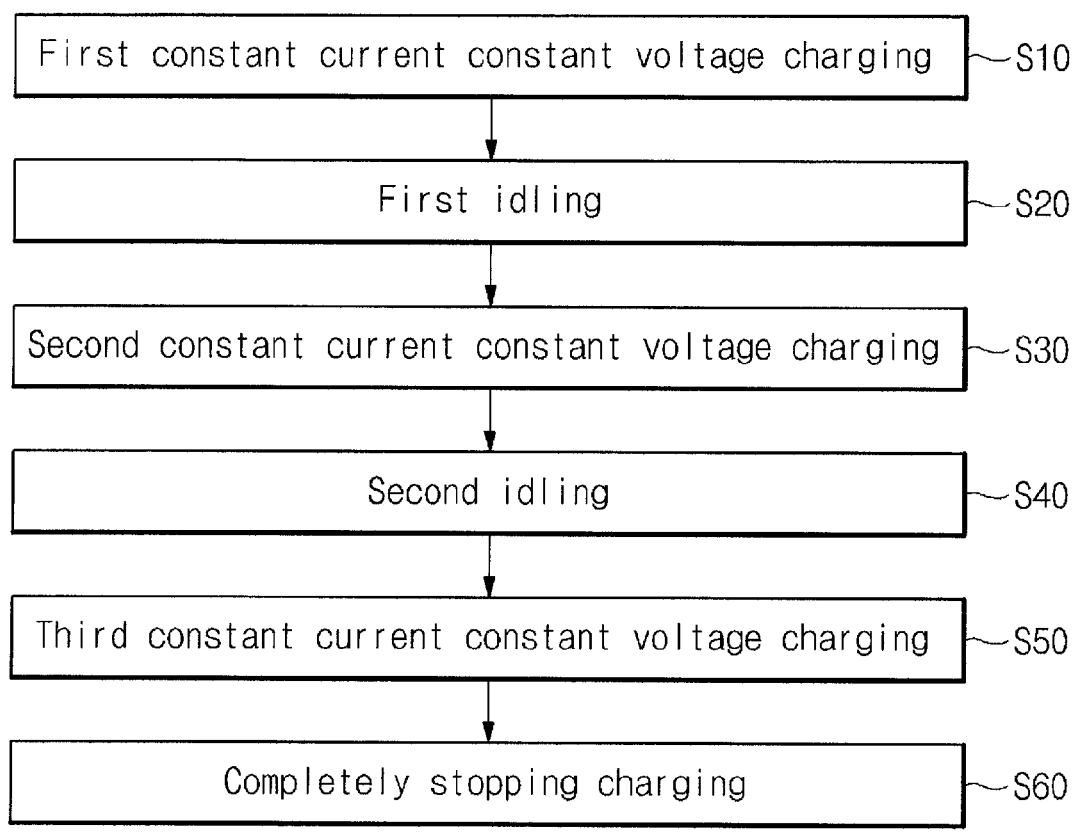
FIG. 1A is a schematic flowchart illustrating a method of charging a battery according to an embodiment of the present invention.
Figure 1B:
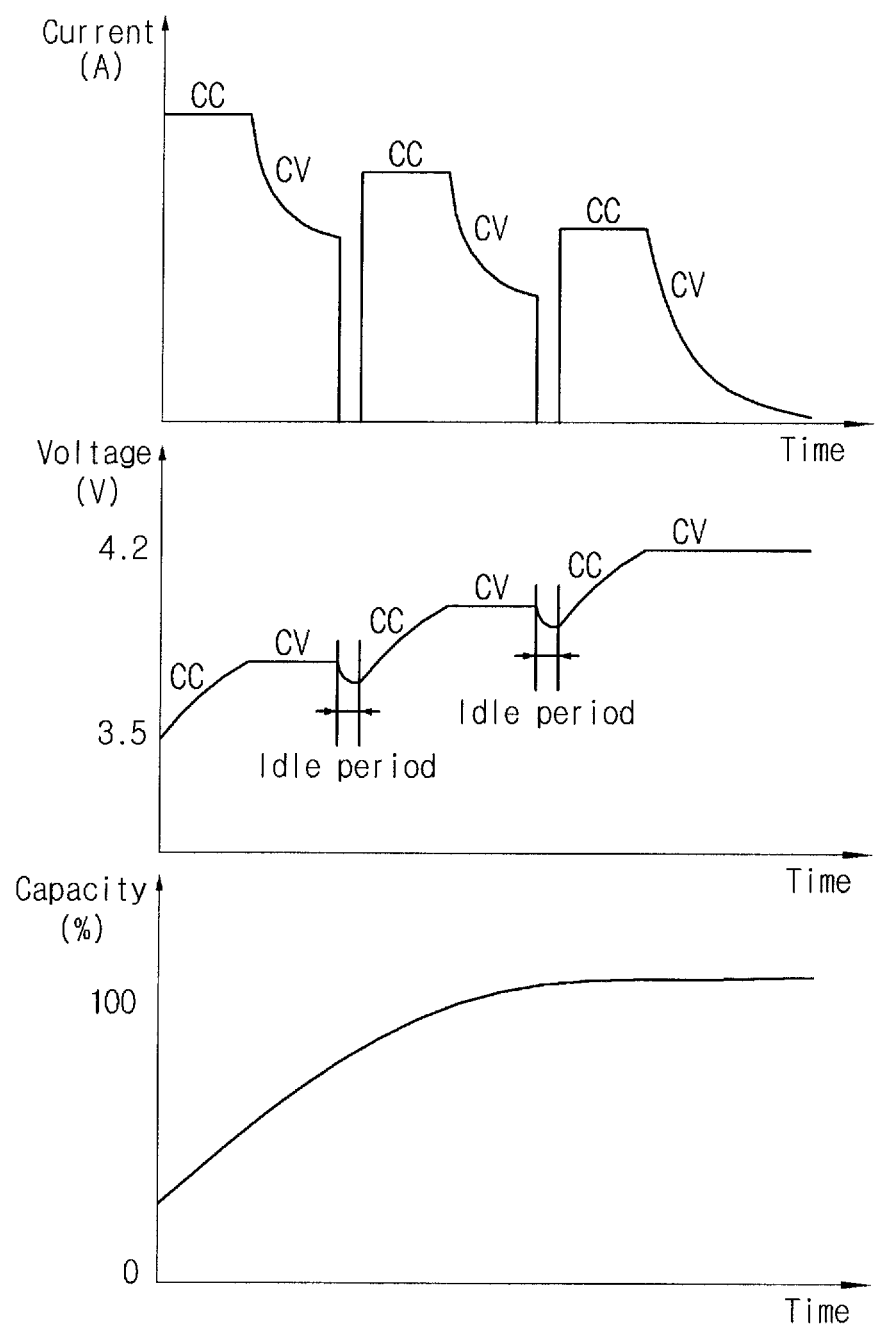
FIG. 1B is a graph illustrating changes in current, voltage and capacity of a battery cell.

FIG. 1A is a schematic flowchart illustrating a method of charging a battery according to an embodiment of the present invention, FIG. 1B is a graph illustrating changes in current, voltage and capacity of a battery cell, and FIG. 1C illustrates a voltage stabilizing time (τ) of a battery cell.

As shown in FIG. 1A, the method of charging a battery according to an embodiment of the present invention includes (S10) first constant current constant voltage charging, (S20) first idling and (S30) second constant current constant voltage charging. The charging method according to an embodiment of the present invention may further include (S40) second idling, (S50) third constant current constant voltage charging, and (S60) completely stopping charging.

In view of current, the charge current is constant in a constant current charge mode and gradually decreases in a constant voltage charge mode. In addition, in view of voltage, the voltage of the battery cell gradually increases in the constant current charge mode and is constant in the constant voltage charge mode. Here, with the lapse of a charging time, the charge capacity of the battery cell gradually increases (see FIG. 1B).

Here, the number of constant current constant voltage charging steps and the idling steps may be smaller or greater than that illustrated herein, but aspects of the present invention are not limited thereto. The number of constant current constant voltage charging steps and the idling steps may vary according to the capacity or characteristic of the battery cell.

As shown in FIG. 1B, the first constant current constant voltage charging (S10) is achieved by charging the battery cell in a first constant current constant voltage mode. That is to say, the battery cell is charged with a constant current (CC) (or a first current) until a voltage of the battery cell reaches (increases to) a predetermined first reference voltage, and then charged with a constant voltage (CV) (or a first voltage) until a charge current of the battery cell reaches a first predetermined reference charge current.

As shown in FIG. 1B, the first idling (S20) is achieved by (idling) stopping charging of the battery cell for an idle period (t) (e.g. a predetermined idle period). That is to say, the charge current is not supplied to the battery cell for the idle period (t) (e.g. a predetermined idle period), the voltage of the battery cell is slightly reduced due to reordering of lithium ions, thereby stabilizing the voltage of the battery cell.

Here, the first idle period (t) may be in a range of about 1 ms to about 10 s. In addition, the first idle period (t) may be about 1 to 10 times of a voltage stabilizing time (τ) of the battery cell. When the idle period falls short of the number range stated above, intercalated/deintercalated states of lithium ions with respect to positive/negative active materials are unstable, deterioration of the battery cell may increase. When the idle period exceeds the number range stated above, suggesting (or meaning) that charging idle period of the battery cell is prolonged, a time for completing the charging is also prolonged.

Referring to FIG. 1C, the voltage stabilizing time (τ) of the battery cell may be defined as a time taken to make a change in the value A of the following equation become 1/e:

$$A(t) = A_n e^{-t/\tau}$$ Equation 1 where $A_n$ is a value obtained by subtracting a stabilized battery cell voltage $v_{n,0}$ from a battery cell voltage $V_n$ of an initial stage of the idle period (t), where n is a natural number and t is greater than 0. That is to say, $A_1=V_1-V_{1,0}$, $A_2=V_2-V_{2,0}$, and $A_3=V_3-V_{3,0}$, ..., $A_n=V_n-V_{n,0}$. In addition, $V_{1,0}$, $V_{2,0}$, $V_{3,0}$, and $V_{n,0}$ may be obtained through experimentation or simulation. At this time, the optimized battery cell voltage stabilizing time ($\tau$) may also be determined.

In equation (1), when the idle period (t) and the voltage stabilizing time ($\tau$) of the battery cell are equal to each other, it is understood that the change in the value A proceeds to 1/e.

The voltage stabilizing time ($\tau$) of the battery cell may depend on various components of the battery cell and may be generally in a range of about 1 ms to about 10 s or may be about 1 to 10 times of the voltage stabilizing time ($\tau$) of the battery cell. That is to say, an improved or maximum intercalation space of lithium ions with respect to a negative active material can be secured, thereby reducing the charge time and reducing or minimizing deterioration of the battery cell.

In addition, the voltage stabilizing time ($\tau$) of the battery cell increases according to the increase in the voltage (capacity) of the battery cell. Accordingly, the idle period may also be prolonged according to the increase in the voltage (capacity) of the battery cell. That is to say, as shown in FIG. 1C, the voltage stabilizing time ($\tau$) of the battery cell may establish the relationship $\tau 3 > \tau 2 > \tau 1$ according to the increase in the voltage (capacity) of the battery cell. In some cases, $\tau 1$, $\tau 2$ and $\tau 3$ may be an equal value.

The second constant current constant voltage charging (S30) is achieved by charging the battery cell in a second constant current constant voltage mode. That is to say, the battery cell is charged with a constant current (CC) (or a second current different from the first current) until a voltage of the battery cell reaches (increases to) a second reference voltage (e.g. a predetermined second reference voltage), and then charged with a constant voltage (CV) (or a second voltage different from the first voltage) until a charge current of the battery cell reaches a second reference charge current (e.g. a predetermined second reference charge current).

Since the voltage of the battery cell gradually increases according to the progress of charging, the second reference voltage is set to be greater than the first reference voltage. In addition, since the charge current supplied to the battery cell gradually decreases according to the progress of charging, the second reference current is set to be smaller than the first reference current.

The second idling (S40) is achieved by idling the charging of the battery cell for a idle period (t) (e.g. a predetermined idle period). That is to say, the charge current is not supplied to the battery cell for the idle period (t) (e.g. the predetermined idle period). Here, the second idle period may be longer than the first idle period. That is to say, in the second idling (S40), the voltage or capacity of the battery cell increases compared to the previous step. Thus, a longer voltage stabilizing time ($\tau$) of the battery cell is desirable. Accordingly, the second idle period may be longer than that of the previous step.

The third constant current constant voltage charging (S50) is achieved by charging the battery cell in a third constant current constant voltage mode.

Here, the third reference voltage is greater than the second reference voltage, and the third reference current is smaller than the second reference current.

That is to say, the battery cell is charged with a constant current (CC) (or a third current different from the first or second current) until the voltage of the battery cell reaches a third reference voltage (e.g. a predetermined third reference voltage), and then charged with a constant voltage (CV) (or a third voltage different from the first or second voltage) until a charge current of the battery cell reaches a third reference charge current (e.g. a predetermined third reference charge current).

The completely stopping of charging (S60) is achieved by completely stopping charging of the battery cell or switching the charge mode to a trickle charge mode when the current of the battery cell reaches a reference charge current (e.g. a predetermined reference charge current).

Meanwhile, the first and second idle periods may be set to be equal to each other or may be adjusted according to the voltage or capacity of the battery cell. In addition, the first and second idle periods may also be adjusted according to the temperature of the battery cell.

In an example, the idle period may be proportional to the voltage or capacity of the battery cell. That is to say, the larger the voltage or capacity of the battery cell, the longer the idle period. In another example, the idle period may be inversely proportional to the temperature of the battery cell. That is to say, the higher the temperature of the battery cell, the higher the concentration of lithium ions, thereby further shortening the idle period.

As described above, the embodiment of the present invention provides a method of charging a battery and a battery charging system, which has a relatively high charging speed while having a relatively low level of deterioration.

That is to say, the embodiments according to the present invention includes at least two sections of constant current, constant voltage charging modes having an idle period, and the idle period is in a range of 1 ms to 10 s, and is 1 to 10 times of a voltage stabilizing time ($\tau$) of the battery cell. Therefore, according to embodiments of the present invention, the battery can be rapidly charged and the voltage of the battery cell is fully stabilized during the idle period, thereby suppressing battery deterioration.

Figure 2:
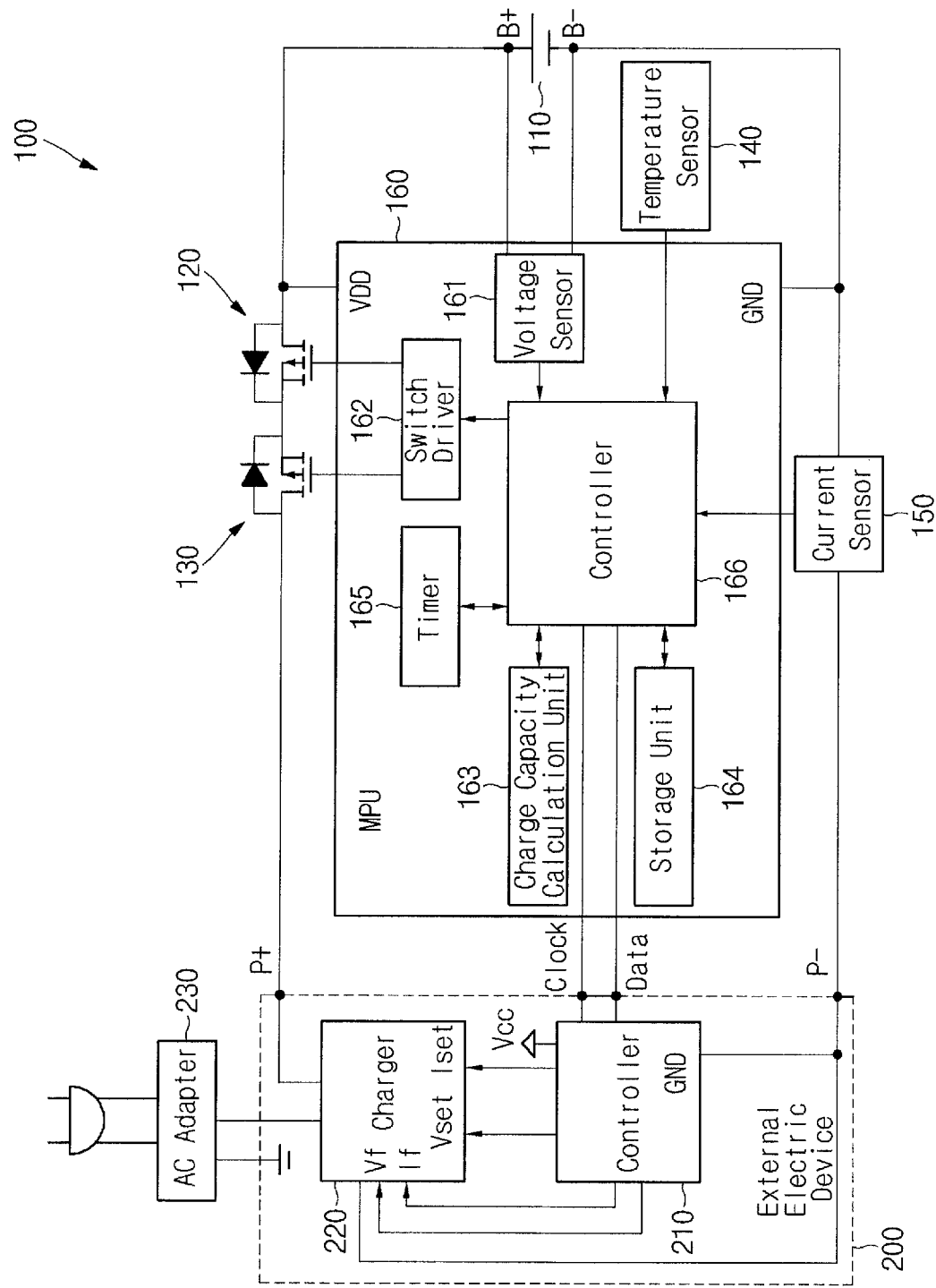
FIG. 2 is a block diagram of a battery system according to an embodiment of the present invention.
Figure 3:
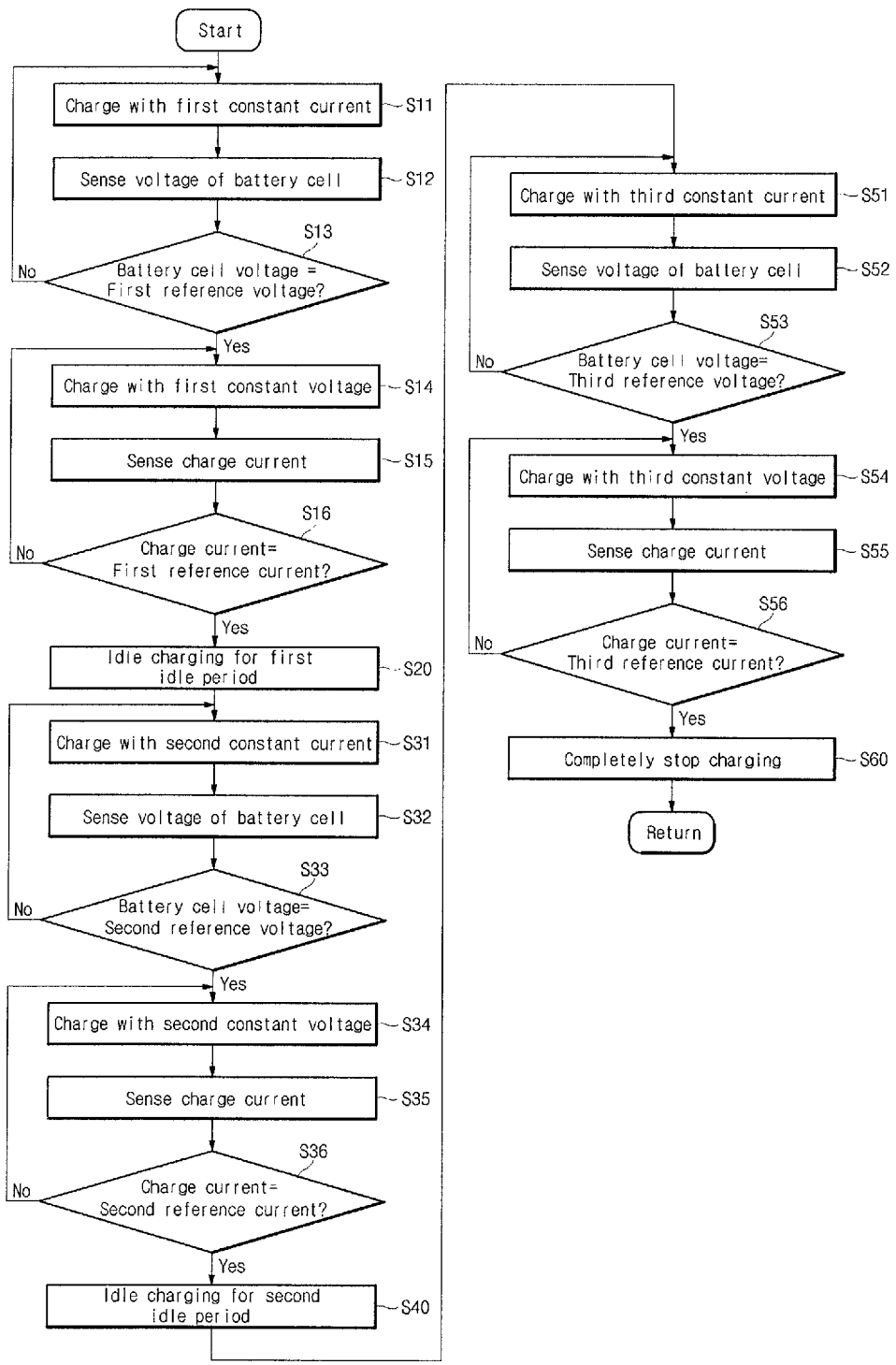
FIG. 3 is a flowchart illustrating a method of charging a battery according to an embodiment of the present invention.

FIG. 2 is a block diagram of a battery system according to an embodiment of the present invention and FIG. 3 is a flowchart illustrating a method of charging a battery according to an embodiment of the present invention, specifically illustrating the flowchart shown in FIG. 1.

As shown in FIG. 2, the battery charging system 100 according to embodiments of the present invention includes a battery cell 110, a charge switch 120, a discharge switch 130, a temperature sensor 140, a current sensor 150 and a micro processor unit (MPU) 160. This configuration may also be defined as a battery pack. The battery charging system 100 is connected to an external electric device 200 through pack terminals P+ and P− and communication terminals C and D. Here, the external electric device 200 may be a mobile phone, a smart phone, a notebook computer, or an electrically driven tool, which is chargeable. The external electric device 200 may be a charging device itself.

The battery cell 110 may be a general rechargeable secondary battery, for example, a lithium ion battery, a lithium ion polymer battery, and so on, but is not limited thereto. While one battery cell 110 is exemplified in the illustrated embodiment, a plurality of battery cells may be coupled to each other in series or in parallel.

The charge switch 120 may be installed between a positive electrode terminal (B+) of the battery cell 110 and a pack positive electrode terminal (P+). When the battery cell 110 is fully charged or overcharged, the charge switch 120 is turned off by a control signal of the MPU 160, thereby preventing the battery cell 110 from being overcharged or further overcharged. The charge switch 120 may be a general MOSFET or a relay, but is not limited thereto.

The discharge switch 130 may also be installed between the positive electrode terminal (B+) of the battery cell 110 and the pack positive electrode terminal (P+). When the battery cell 110 is fully discharged or overdischarged, the discharge switch 130 is turned off by the control signal of the MPU 160, thereby preventing the battery cell 110 from being overdischarged or further overdischarged. The discharge switch 120 may be a general MOSFET or a relay, but is not limited thereto.

The temperature sensor 140 may be directly attached to the battery cell 110 or may be installed in a vicinity of the battery cell 110 and may sense a temperature of the battery cell 110 or an ambient temperature of the battery cell 110 to then transmit the sensed temperature to the MPU 160. The temperature sensor 140 may be, for example, a thermistor, but is not limited thereto.

The current sensor 150 may be installed between a negative electrode terminal (B−) of the battery cell 110 and a pack negative electrode terminal (P−). The current sensor 150 may sense a charge current and a discharge current of the battery cell 110 to then transmit the sensed charge current and the sensed discharge current to the MPU 160. The current sensor 150 may be a general sense resistor, but is not limited thereto.

The MPU 160 includes a voltage sensor 161, a switch driver 162, a charge capacity calculation unit 163, a storage unit 164, a timer 165 and a controller 166. The voltage sensor 161 is coupled to the battery cell 110 in parallel and senses a voltage of the battery cell 110, converts the same into a digital signal to then transmit the digital signal to the controller 166. The current obtained from the current sensor 150 and the temperature obtained from the temperature sensor 140 may also be converted into digital signals to then be transmitted to the controller 166. In addition, the switch driver 162 turns on or off the charge switch 120 and/or the discharge switch 130 by the control signal of the controller 166. That is to say, the controller 166 controls the switch driver 162 based on the information obtained from the temperature sensor 140, the current sensor 150 or the voltage sensor 161. In addition, when it is determined based on the information obtained from the current sensor 150 that an over-current flows in the battery cell 110, the controller 166 transmits a control signal to the switch driver 162 to turn off the charge switch 120 or the discharge switch 130. In addition, when it is determined based on the information obtained from the voltage sensor 161 that the battery cell 110 is fully charged or overcharged and/or fully discharged or overdischarged, the controller 166 transmits a control signal to the switch driver 162 to turn off the charge switch 120 or the discharge switch 130.

The charge capacity calculation unit 163 calculates a currently charged capacity of the battery cell 110 based on the information obtained from the voltage sensor 161. To this end, information on charged capacity relative to voltage of the battery cell 110 may be stored in the storage unit 164 in advance in the form of a lookup table.

As described above, the storage unit 164 may store data of the charged capacity relative to voltage of the battery cell 110, a normal charge voltage range, a normal discharge voltage range, normal charge/discharge current ranges, first, second and third reference voltages, first, second and third reference currents, a lookup table for the battery cell voltage stabilizing time ($\tau$) for each discharge capacity of the battery cell 110, a lookup table for the battery cell voltage stabilizing time ($\tau$) for each temperature of the battery cell 110, a lookup table for the first and second idle periods for each battery cell voltage stabilizing time ($\tau$), and so on. The stored data is supplied to the controller 166. In addition, software or a program for implementing the charging method shown in FIGS. 1A and/or 3 may be stored in the storage unit 164.

The timer 165 measures a charging idle period of the battery cell 110 and transmits the measured period to the controller 166. The timer 165 may be implemented by clocks incorporated into the MPU 160.

As described above, based on the information obtained from the temperature sensor 140, the current sensor 150 and the voltage sensor 161, the controller 166 may operate the switch driver 162 or may transmit information about a target charge voltage (Vset) and/or a target charge current (Iset) of the battery cell 110 or the idle period (t) to the external electric device 200 through the communication terminals C and D using the information about the first, second and third reference voltages, the first, second and third reference currents, the lookup table for the battery cell voltage stabilizing time ($\tau$) for each discharge capacity of the battery cell 110, the lookup table for the battery cell voltage stabilizing time ($\tau$) for each temperature of the battery cell 110, and the lookup table for the first and second idle periods for each battery cell voltage stabilizing time ($\tau$).

In the illustrated embodiment of the present invention, the voltage sensor 161 and the switch driver 162 are controlled by the controller 166 of the MPU 160. However, those skilled in the art after reviewing the present disclosure would recognize that the voltage sensor 161 and the switch driver 162 may also be controlled by a separate analog front end according as the number of battery cells 110 increases. In addition, an MPU and an analog front end may also be separately provided. Alternatively, an MPU and an analog front end may be implemented by a single chip.

The external electric device 200 includes a controller 210 and a charger 220. The controller 210 transmits the information about the target charge voltage (Vset) and/or the target charge current (Iset) of the battery cell 110 to the charger 220 based on the information obtained from the communication terminals C and D of the battery pack. Then, the charger 220 supplies a charge voltage and/or a charge current corresponding to the charge voltage (Vset) and/or charge current (Iset) to the battery pack 100. In addition, the controller 210 receives information about a voltage Vf and a current When fed back from the battery pack and transmits the information to the charger 220, thereby allowing the charger 220 to feedback control the charging of the battery cell 110. Here, an AC adapter 230 for converting AC power to DC power and transmitting the converted power to the charger 220 may be coupled to the charger 220.

The operation of the battery charging system 100 according to embodiments of the present invention will now be described with reference to FIGS. 2 and 3.

In an example, when a user electrically connects the AC adapter 230 to the AC power, the operation of the battery charging system 100 according to embodiments of the present invention is started.

First, the controller 166 transmits to the controller 210 of the external electric device 200 the information about the first, second and third reference voltages, the first, second and third reference currents, the lookup table for the battery cell voltage stabilizing time ($\tau$) for each discharge capacity of the battery cell 110, the lookup table for the battery cell voltage stabilizing time ($\tau$) for each temperature of the battery cell 110, and the lookup table for the first and second idle periods for each battery cell voltage stabilizing time ($\tau$), and controls the controller 210 of the external electric device 200 to allow the charger 220 to charge the battery cell 110 with the first constant current (S11).

When the charging is performed with the first constant current, the controller 166 of the battery pack senses a voltage of the battery cell 110 from the voltage sensor 161 (S12).

The controller 166 of the battery pack determines whether or not the sensed voltage of the battery cell 110 reaches a predetermined first reference voltage (S13). When the sensed voltage of the battery cell 110 reaches the first reference voltage (e.g. the predetermined first reference voltage), information about the battery cell 110 (that is, information about the charge voltage (Vset) and/or the charge current (Iset) is updated to then retransmit the updated information to the controller 210 of the external electric device to allow the controller 210 of the external electric device to control the charger 220, thereby charging the battery cell 110 with a first constant voltage (S14).

When the charging is performed with the first constant voltage, the controller 166 of the battery pack senses a charge current of the battery cell 110 from the current sensor 150 (S15).

The controller 166 of the battery pack determines whether or not the sensed charge current of the battery cell 110 reaches a first reference current (S16) (e.g. the predetermined first reference current). When the charge current of the battery cell 110 reaches the first reference current, the controller 166 of the battery pack transmits the information about the battery cell 110 (e.g., information about the first idle period) to the controller 210 of the external electric device 200 to allow the controller 210 of the external electric device 200 to control the charger 220, thereby idling the charging of the battery cell 110 for the first idle period (S20) (e.g. the predetermined first idle period).

The controller 166 of the battery pack determines whether or not the timer 165 indicates a period of time exceeding the first idle period. When the timer 165 indicates a period of time exceeding the first idle period, the controller 166 of the battery pack updates the information about the battery cell 110 (e.g., information about the target charge voltage (Vset) and/or the target charge current (Iset) to then transmit the same to the controller 210 of the external electric device 200 to allow the controller 210 of the external electric device to control the charger 220, thereby charging the battery cell 110 with a second constant current (S31).

When the charging is performed with the second constant current, the controller 166 of the battery pack senses a voltage of the battery cell 110 from the voltage sensor 161 (S32).

The controller 166 of the battery pack determines whether or not the sensed voltage of the battery cell 110 reaches a second reference voltage (S13) (e.g. a predetermined second reference voltage). When the sensed voltage of the battery cell 110 reaches the second reference voltage, the information about the battery cell 110 (that is, the information about the charge voltage (Vset) and/or the charge current (Iset) is updated to then retransmit the updated information to the controller 210 of the external electric device to allow the controller 210 of the external electric device to control the charger 220, thereby charging the battery cell 110 with the second constant voltage (S34).

When the charging is performed with the second constant voltage, the controller 166 of the battery pack senses a charge current of the battery cell 110 from the current sensor 150 (S35).

The controller 166 of the battery pack determines whether or not the sensed charge current of the battery cell 110 reaches the second reference current (S36) (e.g. the predetermined second reference current). When the charge current of the battery cell 110 reaches the second reference current, the controller 166 of the battery pack transmits the information about the battery cell 110 (e.g., information about the second idle period) to the controller 210 of the external electric device 200 to allow the controller 210 of the external electric device 200 to control the charger 220, thereby idling the charging of the battery cell 110 for the second idle period (S40) (e.g. the predetermined second idle period).

The controller 166 of the battery pack determines whether or not the timer 165 indicates a period of time exceeding the second idle period. When the timer 165 indicates a period of time exceeding the second idle period, the controller 166 of the battery pack updates the information about the battery cell 110 (e.g., the information about the target charge voltage (Vset) and/or the target charge current (Iset) to then transmit the same to the controller 210 of the external electric device 200 to allow the controller 210 of the external electric device to control the charger 220, thereby charging the battery cell 110 with a third constant current (S51).

When the charging is performed with the third constant current, the controller 166 of the battery pack senses a voltage of the battery cell 110 from the voltage sensor 161 (S52).

The controller 166 of the battery pack determines whether or not the sensed voltage of the battery cell 110 reaches a third reference voltage (S53) (e.g. a predetermined third reference voltage). When the voltage of the battery cell 110 reaches the third reference voltage, the controller 166 of the battery pack updates the information about the battery cell 110 (e.g., the information about the target charge voltage (Vset) and/or the target charge current (Iset)) to then retransmit the updated information to the controller 210 of the external electric device 200 to allow the controller 210 of the external electric device 200 to control the charger 220, thereby charging the battery cell 110 with a third constant voltage (S54).

When the charging is performed with the third constant voltage, the controller 166 of the battery pack senses a charge current of the battery cell 110 from the current sensor 150 (S55).

The controller 166 of the battery pack determines whether or not the sensed charge current of the battery cell 110 reaches a third reference current (S56) (e.g. the predetermined third reference current). When the charge current of the battery cell 110 reaches the third reference current, the controller 166 of the battery pack transmits the information about stopping the charging of the battery cell 110 to the controller 210 of the external electric device 200 to make the controller 210 of the external electric device 200 to stop operating the charger 220, thereby completely stopping the charging of the battery cell 110 (S60).

Here, the first and second idle periods may be set to be equal to each other or may be differently set according to the voltage, capacity or temperature of the battery cell 110. For example, the idle period may gradually increase according the increase in the voltage or charged capacity of the battery cell 110. In addition, the idle period may gradually decrease according the increase in the temperature of the battery cell 110.

In addition, the first reference voltage is set to be smaller than the second reference voltage and the second reference voltage is set to be smaller than the third reference voltage. In addition, the first reference current is set to be greater than the second reference current and the second reference current is set to be greater than the third reference current.

In the illustrated embodiment, it has been described that the controller 166 of the battery pack transmits the information about the target charge voltage and/or the target charge current of the battery cell 110 and the idle period of the battery cell 110 to the controller 210 of the external electric device 200. However, in some cases, the controller 210 of the external electric device 200 may determine on its own the target charge voltage and/or the target charge current of the battery cell 110 and the idle period of the battery cell 110. That is to say, when the controller 166 of the battery pack transmits basic information about the battery cell 110, that is, the information about current, charge capacity, temperature, and so on, to the controller 210 of the external electric device 200, the controller 210 of the external electric device 200 may determine the target voltage and/or current, the idle period, etc. of the battery cell 110 based on the basic information about the battery cell 110. To this end, the controller 210 of the external electric device 200 may use additional software and/or hardware.

Although the battery charging method and the battery charging system according to an exemplary embodiment of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims, and their equivalents.

What is claimed is:

1. A method of charging a battery, the method comprising:
   charging a battery cell with a first constant current in a first constant current mode;
   charging the battery cell with a first constant voltage in a first constant voltage mode;
   idling the charging of the battery cell for an idle period (t) after the charging the battery cell in the first constant voltage mode;
   charging the battery cell with a second constant current different from the first constant current in a second constant current mode after the idling the charging of the battery cell; and
   charging the battery cell with a second constant voltage that is higher than the first constant voltage in a second constant voltage mode.

2. The method of claim 1, wherein the idle period (t) is in a range of about 1 ms to about 10 s.

3. The method of claim 1, wherein the idle period (t) is about 1 to about 10 times a voltage stabilizing time ($\tau$) of the battery cell.

4. The method of claim 3, wherein the voltage stabilizing time ($\tau$) of the battery cell is an amount of time taken to reduce a value A(t) of the following equation by 1/e:

$$A(t)=A_n e^{-t/\tau}$$

where $A_n$ is a value obtained by subtracting a stabilized battery cell voltage $v_{n,0}$ from a battery cell voltage $V_n$ of an initial stage of the idle period (t), where n is a natural number and t is greater than 0.

5. The method of claim 1, further comprising calculating a charge capacity of the battery cell, wherein the idle period (t) is proportional to the charge capacity of the battery cell.

6. The method of claim 1, further comprising sensing a temperature of the battery cell, wherein the idle period (t) is inversely proportional to the temperature of the battery cell.

7. The method of claim 1, further comprising:
   determining whether or not a voltage of the battery cell reaches a first reference voltage by sensing the voltage of the battery cell while charging the battery cell with the first constant current in the first constant current mode; and
   determining whether or not a current of the battery cell reaches a first reference current by sensing a charge current of the battery cell while charging the battery cell with the first constant voltage in the first constant voltage mode.

8. The method of claim 7, wherein when the charge current of the battery cell reaches the first reference current, the idling is performed.

9. The method of claim 7, further comprising:
   determining whether or not a voltage of the battery cell reaches a second reference voltage by sensing the voltage of the battery cell while charging the battery cell with the second constant current in the second constant current mode; and
   determining whether or not a charge current of the battery cell reaches a second reference current by sensing the charge current of the battery cell while charging the battery cell with the second constant voltage in the second constant voltage mode.

10. The method of claim 9, wherein the second reference voltage is greater than the first reference voltage.

11. The method of claim 9, wherein the second reference current is smaller than the first reference current.

12. The method of claim 1,
   wherein the first constant voltage mode is immediately after the first constant current mode,
   wherein the idle period is immediately after the first constant voltage mode,
   wherein the second constant current mode is immediately after the idle period, and
   wherein the second constant voltage mode is immediately after the second constant current mode.

13. A battery charging system comprising:
   a battery pack comprising a battery cell, a voltage sensor configured to sense a voltage of the battery cell, and a current sensor configured to sense a charge current for charging the battery cell; and
   a charging unit configured to charge the battery cell with a first constant current in a first constant current mode, charging the battery cell with a first constant voltage in a first constant voltage mode, idling the charging of the battery cell for an idle period (t) after the charging the battery cell in the first constant voltage mode, charging the battery cell with a second constant current different from the first constant current in a second constant current mode, and charging the battery cell with a second constant voltage that is higher than the first constant voltage in a second constant voltage mode after the idling the charging of the battery cell.

14. The battery charging system of claim 13, wherein the idle period (t) is in a range of about 1 ms to about 10 s.

15. The battery charging system of claim 13, wherein the idle period (t) is about 1 to about 10 times a voltage stabilizing time ($\tau$) of the battery cell.

16. The battery charging system of claim 15, wherein the voltage stabilizing time ($\tau$) of the battery cell is a time taken to reduce a value A(t) of the following equation by 1/e:

$$A(t)=A_n e^{-t/\tau}$$

where $A_n$ is a value obtained by subtracting a stabilized battery cell voltage $v_{n,0}$ from a battery cell voltage $V_n$ of an initial stage of the idle period (t), where n is a natural number and t is greater than 0.

17. The battery charging system of claim 13, further comprising a calculation unit configured to calculate a charge capacity of the battery cell, wherein the idle period (t) of the charging unit is controlled to be proportional to the charge capacity of the battery cell.

18. The battery charging system of claim 13, further comprising a temperature sensor configured to sense a temperature of the battery cell, wherein the idle period (t) of the charging unit is controlled to be inversely proportional to the temperature of the battery cell.

19. The battery charging system of claim 13,
wherein the first constant voltage mode is immediately after the first constant current mode,
wherein the idle period is immediately after the first constant voltage mode,
wherein the second constant current mode is immediately after the idle period, and
wherein the second constant voltage mode is immediately after the second constant current mode.

20. A method of charging a battery, the method comprising:
charging a battery cell with a first current in a first constant current mode;
charging the battery cell with a first voltage in a first constant voltage mode;
idling the charging of the battery cell for an idle period (t);
charging the battery cell with a second current different from the first current in a second constant current mode; and
charging the battery cell with a second voltage different from the first voltage in a second constant voltage mode,
wherein the idle period (t) is about 1 to about 10 times a voltage stabilizing time ($\tau$) of the battery cell, and
wherein the voltage stabilizing time ($\tau$) of the battery cell is an amount of time taken to reduce a value A(t) of the following equation by 1/e:

$$A(t) = A_n e^{-t/\tau}$$

where $A_n$ is a value obtained by subtracting a stabilized battery cell voltage $v_{n,0}$ from a battery cell voltage $V_n$ of an initial stage of the idle period (t), where n is a natural number and t is greater than 0.

* * * * *

UNITED STATES PATENT AND TRADEMARK OFFICE
CERTIFICATE OF CORRECTION

PATENT NO. : 9,627,719 B2  
APPLICATION NO. : 14/203526  
DATED : April 18, 2017  
INVENTOR(S) : Joosick Jung et al.

It is certified that error appears in the above-identified patent and that said Letters Patent is hereby corrected as shown below:

In the Claims

Column 12, Line 61, Claim 16      delete "lie:"  
      insert -- 1/e: --

Signed and Sealed this  
Second Day of July, 2019

Andrei Iancu  
*Director of the United States Patent and Trademark Office*